United States Patent [19]

Kato et al.

[11] Patent Number: 4,706,118
[45] Date of Patent: Nov. 10, 1987

[54] CONTROL CIRCUIT FOR VIDEO ENDOSCOPE

[75] Inventors: Shinichi Kato; Masahiko Sasaki; Tadashi Kato; Masahide Kanno; Yutaka Takahashi; Katsuyuki Saito, all of Tokyo, Japan

[73] Assignee: Olympus Optical Co., Ltd., Tokyo, Japan

[21] Appl. No.: 914,168

[22] Filed: Oct. 1, 1986

[30] Foreign Application Priority Data

Oct. 9, 1985 [JP] Japan .................................. 60-225368
Oct. 18, 1985 [JP] Japan ............................. 60-159514[U]

[51] Int. Cl.$^4$ .............................................. H04N 7/18
[52] U.S. Cl. ....................................... 358/98; 358/149
[58] Field of Search ........................ 358/98, 149; 128/4, 128/6

[56] References Cited

U.S. PATENT DOCUMENTS

| 4,285,063 | 8/1981 | Zbinden | 358/149 |
| 4,539,586 | 9/1985 | Danna et al. | 358/98 |
| 4,601,284 | 7/1986 | Arakawa | 128/6 |
| 4,667,230 | 5/1987 | Arakawa | 358/98 |

FOREIGN PATENT DOCUMENTS 58-195818 11/1983 Japan ..................................... 358/98

Primary Examiner—Howard W. Britton

[57] ABSTRACT

Disclosed is a control circuit which is connected to a video endoscope, having a CCD in the distal end thereof. The control circuit supplies driving clock pulses to the CCD, and converts a picture element signal pulses from the CCD into a continuous image signal, by clamping, or sampling and holding, the signal pulses. The converted signals are further subjected to video processing. A scope discrimination resistor is contained in the endoscope, in the vicinity of a connector thereof, which connects the endoscope and the control circuit. The resistance value of the resistor depends on the length of the endoscope. When the endoscope is connected to the control circuit, the resistor is connected in series with a constantcurrent source in a scope discrimination circuit. The discrimination circuit discriminates the scope length by detecting the resistance value of the resistor as a terminal voltage. The waveform of the driving clock pulses for the CCD is modified in accordance with the result of the discrimination, and the timing for clamping, or sampling and holding, the picture-element signal pulses from the CCD (10), is determined by the discrimination result.

10 Claims, 8 Drawing Figures

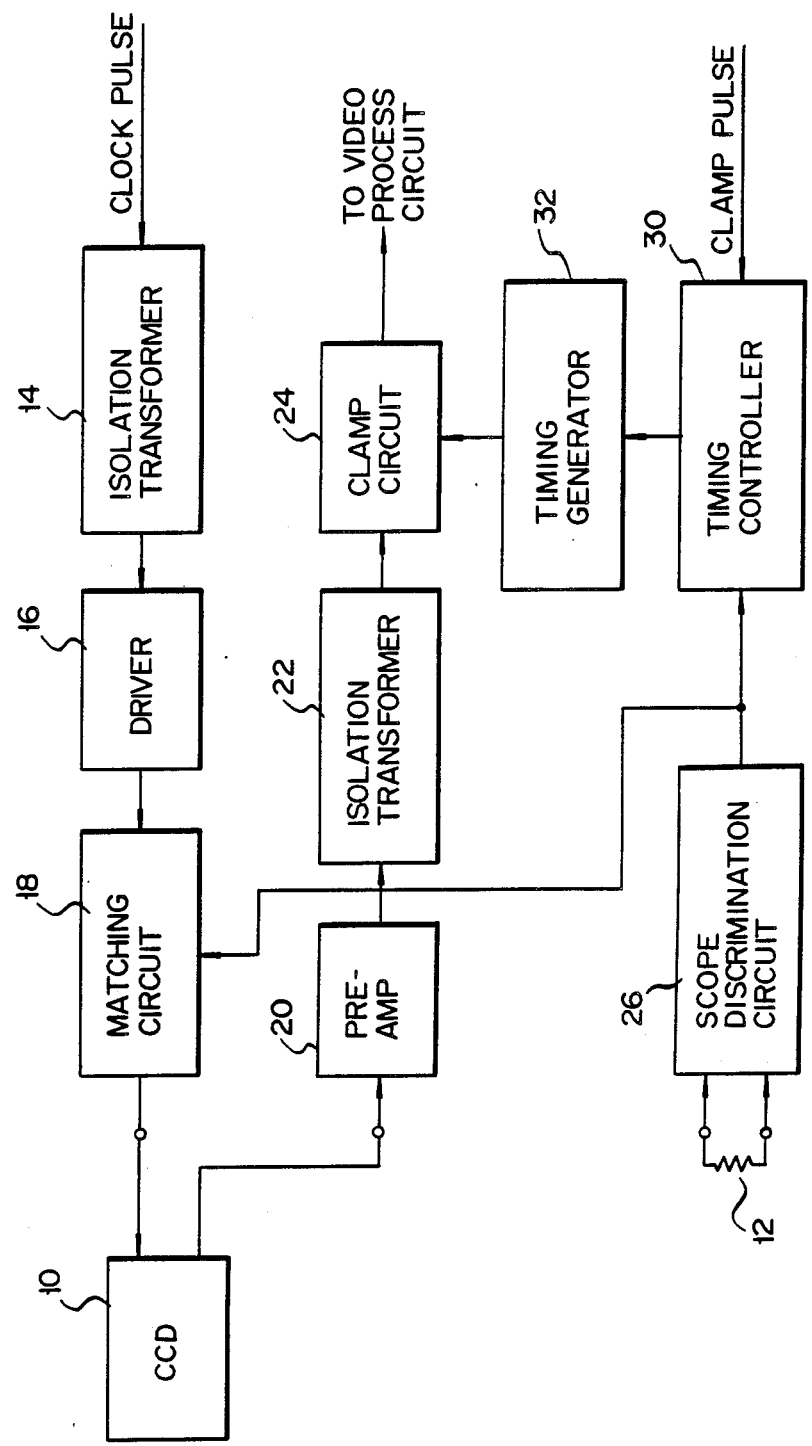
F I G. 1

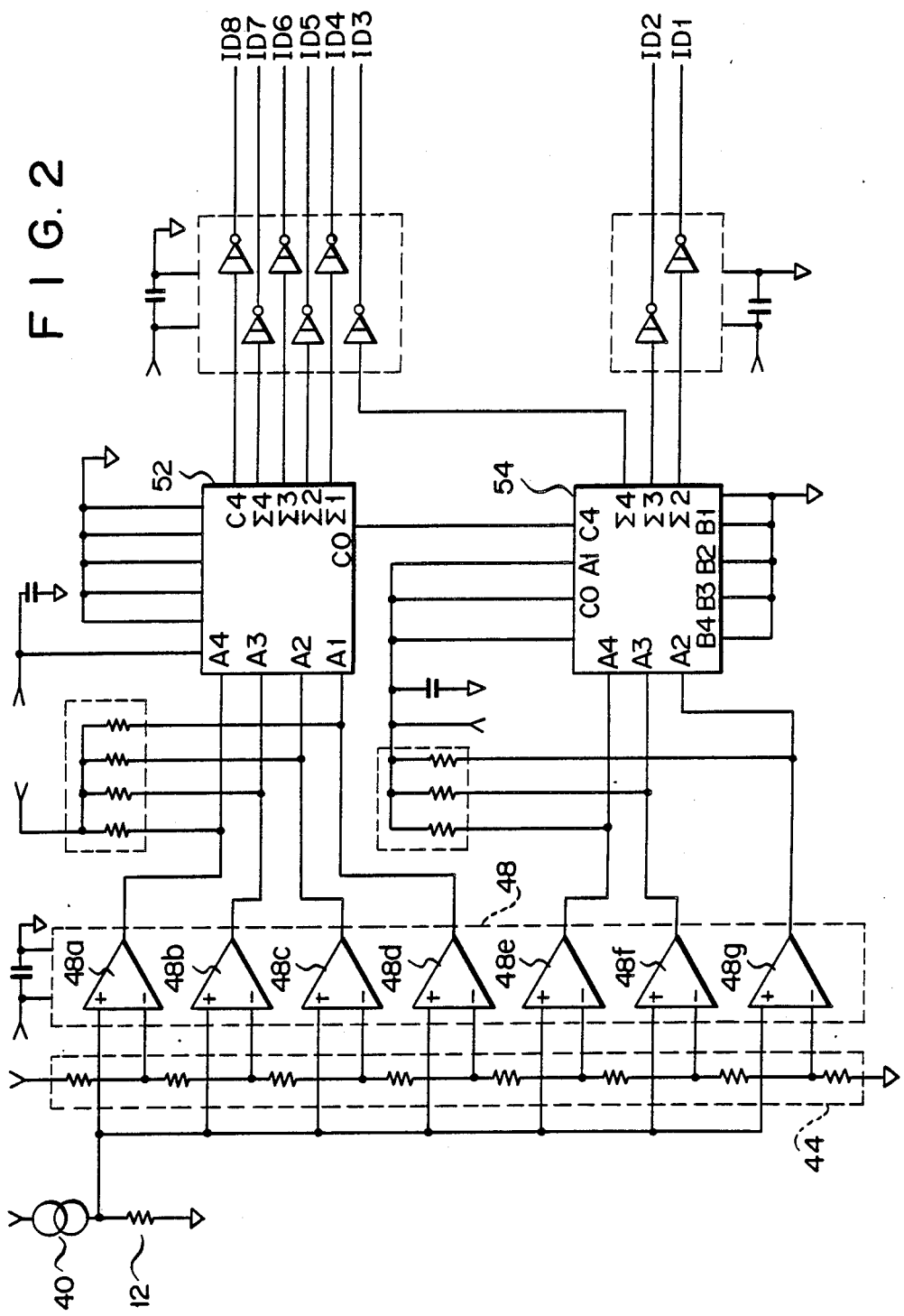
F I G. 2

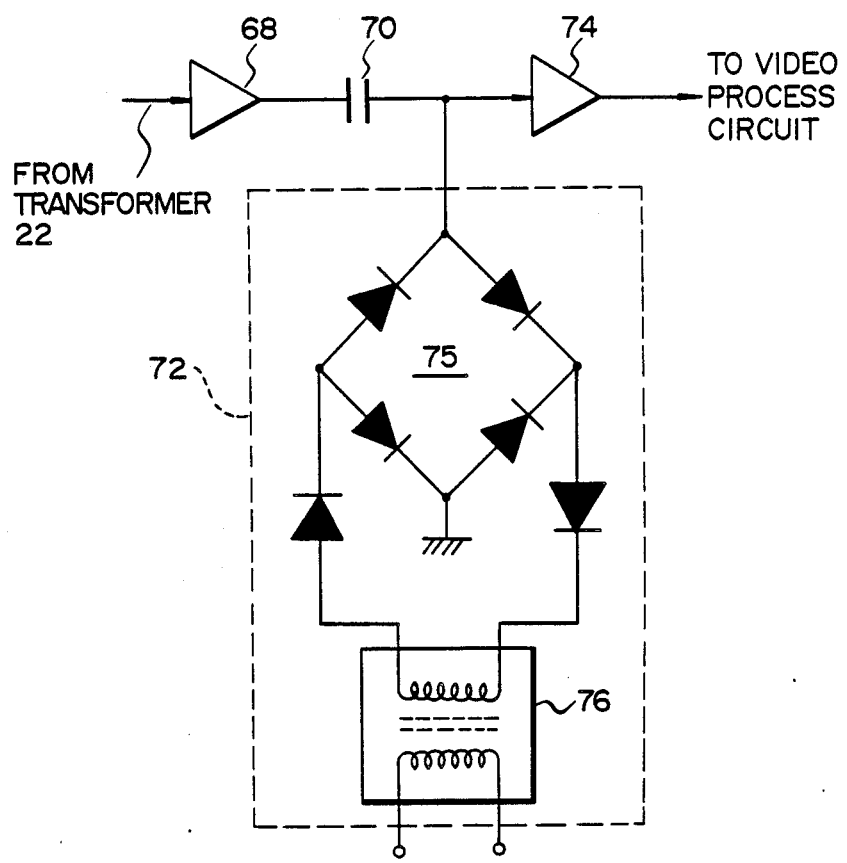
F I G. 4 scope and the control circuit. The resistor 12 indicates the length of the endoscope, or more exactly, the length of a signal line extending from the connector to CCD 10. The resistance 12 value of resistor 12 depends on the endoscope length.

Clock pulses from a pulse generator (not shown), used to drive CCD 10, are applied to the input of driver 16 through isolation transformer 14, and their voltage is raised to a predetermined level. In this case, driver 16 is an amplifier. The waveform of the output of driver 16 is modified by matching circuit 18 (shown in detail in FIG. 3), and the modified output signal is supplied to CCD 10. Although the clock pulses for CCD 10 are shown in the form of a single signal in FIG. 1, they actually are signals of a plurality of phases, e.g., three-phase signals.

Image signal pulses from CCD 10 are applied to the input of clamp circuit 24, through preamplifier 20 and isolation transformer 22. The level of the image signal pulses is fetched with predetermined timing, and maintained as it is. The clamping timing of circuit 24 is controlled by timing generator 32, which produces timing pulses in accordance with the output of timing controller 30, to which clamp pulses are supplied from a control circuit (not shown). The output of clamp circuit 24 is supplied to a video process circuit.

When video endoscope is connected to the connector, resistor 12 for scope discrimination is connected to scope discrimination circuit 26 (shown in detail in FIG. 2). Circuit 26 discriminates the length of a scope by detecting the resistance value of resistor 12. Based on the discrimination result, matching circuit 18 and timing controller 30 are controlled.

FIG. 2 shows scope discrimination circuit 26 in detail. Circuit 26 is provided with current source 40, which is connected in series with resistor 12. Thus, the resistance value of resistor 12 is detected as a terminal voltage. The terminal voltage of resistor 12 is applied to the positive input terminals of seven comparators 48a to 48g, which constitute comparator circuit 48. The negative input terminals of comparators 48a to 48g are supplied with voltages at voltage-dividing points of voltage divider 44, which is formed of eight resistors, connected in series between positive and negative power sources. The voltage dividing points correspond to nodes between the resistors. The voltages applied to the negative input terminals become lower in the order of comparators 48a to 48g. The outputs of comparators 48a to 48g, all together, constitute a seven-bit binary signal. The outputs of comparators 48a and 48g are assigned to MSB (most significant bit) and LSB (least significant bit), respectively. In response to the resistance value of resistor 12, comparator circuit 48 deliver the binary signal, whose zeroth (LSB) to nth bits are 1 (n is any integral number from zero to six), and whose (n+1)th to sixth (MSB) bits are 0.

The zeroth, first, and second bits, corresponding to the outputs of comparators 48g, 48f and 48e of comparator circuit 48, respectively, are applied to input terminals A2, A3 and A4 of adder circuit 54, respectively. The third, fourth, fifth, and sixth bits, corresponding to the outputs of comparators 48d, 48c, 48b and 48a, respectively, are applied to input terminals A1, A2, A3 and A4 of adder circuit 52, respectively. Adder circuits 52 and 54 cooperate and add one to the outputs of comparator circuit 48. In the outputs of circuit 48, the higher-order bits are 1, and the lower-order bits are 0. If one is added to the outputs, therefore, all the bits but one are 0. Thus, the position of the bit being 1, out of the outputs of circuits 52 and 54, indicates the resistance value of resistor 12. If the comparator output is 0001111, for example, it becomes 0010000 after one is added to it. If the comparator output is 1111111, it becomes 10000000 after one is added to it. Thus, eight binary identification signals ID1 to ID8, which are all 0 except one, are delivered from adder circuits 52 and 54.

In this manner, the type (scope length) of the video endoscope can be discriminated with use of a simple arrangement, by supplying constant current to resistor 12 in the endoscope, and detecting the resistance value of resistor 12 as a terminal voltage. Although the identification signals are more than one in number, they can be used directly for the switching of switching elements, since all of them, except one, are 0.

Referring now to FIG. 3, matching circuit 18 will be described in detail. Isolation transformer 14 is connected to driver 16 through capacitor 60. Circuit 18 includes relay switches S1 to S8, and CR differentiation circuits DL1 to DL8 connected to switches S1 to S8, respectively. The output of driver 16 is supplied to circuits DL1 to DL8 via switches S1 to S8. The time constants of circuits DL1 to DL8 are different from one another. Switches S1 to S8 are controlled by identification signals ID1 to ID8, and closed by a identification signal being 1. As mentioned before, only one of signals ID 1 to ID 8 is 1, so that only one of switches S1 to S8 is closed. Accordingly, the clock pulses for CCD 10 are differentiated by one of differentiation circuits DL1 to DL8, using a time constant corresponding to the scope length. As a result of this differentiation, the clock pulses take a waveform such that a differential component is added to the leading edge of an original square waveform. The waveform of the added differential component is deteriorated while the clock pulses are being transmitted through the signal line. When the clock pulses are applied to CCD 10, the waveform restores the original square waveform. In short, the differentiation circuits, in matching circuit 18, serve to previously compensate the waveform components, which are to be deteriorated while the clock pulses are being transmitted through the signal line. Thus, according to this embodiment, the solid-state pickup element is prevented from being driven in a wrong manner, due to waveform deterioration during the transmission of the clock pulses, by previously modifying the waveform of the clock pulses according to the scope length.

FIG. 4 is a detail circuit diagram of clamp circuit 24. Image signal pulses from isolation transformer 22 are supplied to a video processing circuit through impedance converter 68, capacitor 70, and impedance converter 74. Dynamic clamp circuit 72 is connected between capacitor 70 and converter 74. Circuit 72 includes analog switch 75, formed of bridge connected diodes, and self-bias transformer 76 for supplying a bias current pulse to switch 75. The timing pulses from timing generator 32 are supplied to transformer 76. In response to these pulses, image signal pulses from CCD 10 are clamped and converted into a continuous image signal.

As mentioned before, the clamping timing is delayed for the same duration as the delay of the image signal pulses caused by the signal line, depending on scope-length identification signals ID1 to ID8. Thus, the image signal pulses can be clamped with a correct timing, without being affected by the delay time during the transmission of the signal through the signal line.

CONTROL CIRCUIT FOR VIDEO ENDOSCOPE

BACKGROUND OF THE INVENTION

The present invention relates to a control circuit for video endoscope.

Improved video endoscopes have recently been developed with the progress of solid-state pickup elements. In these endoscopes, a solid-state pickup element, such as a charge-coupled device (CCD), is contained in the distal end of the endoscope, and used to pick up an image of the interior of the body cavity. The image from the pickup element is transmitted, through a signal line in the endoscope, to an outside display unit, whereupon it is displayed.

Conventionally, a light source of an endoscope is provided as a light source unit, independent of the body of the endoscope, and the endoscope is connected to the unit by means of a universal cord, which extends from the endoscope body. An illumination light from the light source unit is transmitted through a light guide fiber in the universal cord and the endoscope body, and is then applied to an object.

Video endoscopes of this type require a driver circuit for generating clock pulses, used to drive the solid-state pickup element, a video processing circuit for video-processing an image signal from the pickup element, and other circuits. Usually, these circuit units are disposed in the light source unit. The clock pulses for the pickup element and image signals from the element are transferred between the light source unit and the pickup element, by means of a signal line in the universal cord.

In general, endoscopes are available with various lengths and diameters, depending on the region into which the endoscope is to be inserted. Meanwhile, in order to commonly use the aforesaid circuit units for the various endoscopes, the same solid-state pickup element is used in all types of video endoscopes. If the length of an endoscope is different from that of another, however, the length of the signal line, extending from the circuit units in the light source unit to the distal end of the endoscope, varies correspondingly, thus resulting in the following awkward situations.

If the signal line is lengthened, the waveform of the clock pulses, supplied from the driver circuit to the solid-state pickup element, is deteriorated and ceases to be an exactly square one. Accordingly, the pickup element cannot be driven correctly. Further, the transmission of the image signals, from the element to the video processing circuit, is delayed. The image signals delivered from the pickup element are intermittent picture-element signal pulses. Therefore, the video processing circuit must first convert them into continuous image signals by clamping them, or by sampling and holding them. Such a process must be synchronized with the generation timing of the drive clock pulses. If the transmission of the image signals is delayed, the synchronism cannot be maintained, so that extra data, not including the picture-element information, will be clamped, or sampled and held. Thus, accurate image signals cannot be obtained. Moreover, the influences of the delay of transmission on the signal line vary according to the endoscope length. Conventionally, therefore, two or more different types of video endoscopes, with different lengths, cannot be connected to a single light source unit.

With use of these prior art video endoscopes, furthermore, diagnoses are made frequently on the basis of the color of a displayed image of the affected part, rather than its shape. Accordingly, the color-reproducibility of the display unit should be considerably accurate, and its color adjustment must be performed carefully. In a conventional method of color adjustment, a color chart is picked up in advance, and the image color is adjusted in accordance with the chart, displayed on a screen. However, the distal end portion of the video endoscopes has a diameter of a little more than ten millimeters, and the angle of view is very wide. Therefore, the photographing of the color chart is a delicate work, so that the color adjustment cannot be performed with speed.

SUMMARY OF THE INVENTION

An object of the present invention is to provide a control circuit for video endoscope, connectible with any types of video endoscopes.

Another object of the invention is to provide a control circuit for video endoscope, capable of speedy color adjustment of a display screen.

According to the present invention, there is provided a control circuit for video endoscope, which comprises means for detecting the type of a video endoscope connected to the control circuit; means for modifying the waveform of clock pulses in accordance with the result of detection by the detecting means, and supplying the modified clock pulses to a solid-state pickup element in the endoscope; and means for converting image signal pulses, supplied from the pickup element, into a continuous image signal, by clamping, or sampling and holding the pulses, with a timing corresponding to the detection result given by the detecting means.

BRIEF DESCRIPTION OF THE DRAWINGS

FIG. 1 is a block diagram of a control circuit for video endoscope according to the present invention;

FIG. 2 is a circuit diagram of a scope discrimination circuit shown in FIG. 1;

FIG. 4 is a circuit diagram of a clamp circuit shown in FIG. 1;

DETAILED DESCRIPTION OF THE PREFERRED EMBODIMENT

Figure 3:
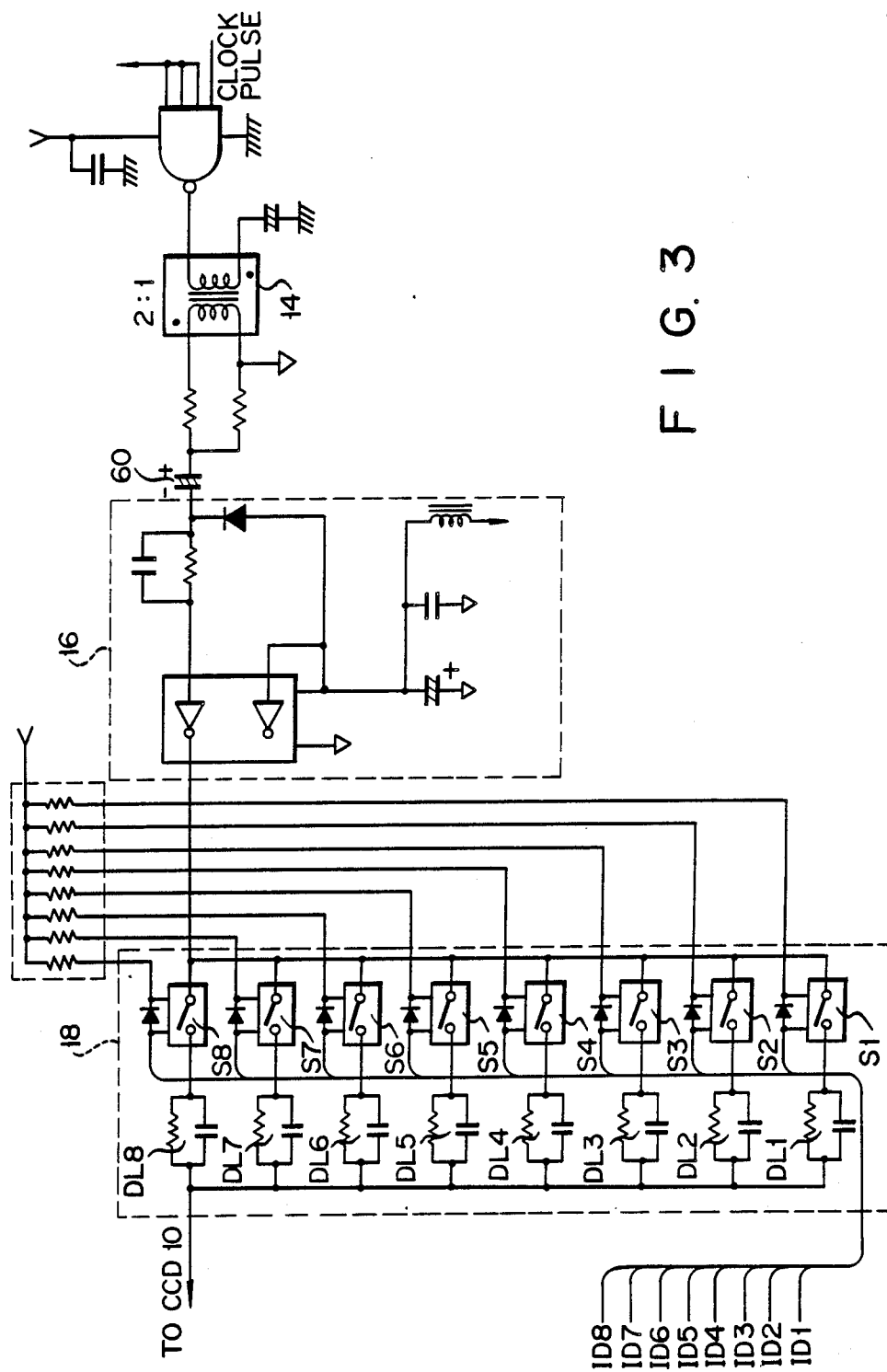
FIG. 3 is a circuit diagram of a matching circuit shown in FIG. 1.

An embodiment of a control circuit for video endoscope according to the present invention will be described in detail with reference to the accompanying drawings. FIG. 1 is a block diagram of the control circuit, to which a video endoscope is connected. Charge-coupled device (CCD) 10, as a solid-state pickup element, is contained in a distal end portion of the endoscope, whereby an image of the interior of the body cavity is picked up. Light from a lamp (not shown) is transmitted through a light guide fiber, to illuminate the inside of the body cavity. Resistor 12 for scope discrimination is contained in the endoscope, in the vicinity of a connector, which connects the endo- Timing controller 30, which is constructed in substantially the same manner as matching circuit 18 shown in FIG. 3, comprises eight one-shot multivibrators with different time constants, in place of CR differentiation circuits DL1 to DL8. Clamp pulses (synchronous with the clock pulses) are supplied to the multivibrators through relay switches. Any one of the switches is closed in response to scope-length identification signals ID1 to ID8, and an output pulse signal from any one of the multivibrators is supplied to timing generator 32. A timing pulse is produced at the trailing edge of the pulse signal.

Image signal pulses can be converted into a continuous signal with use of a sampling/holding circuit, in place of clamp circuit 24.

Figure 5:
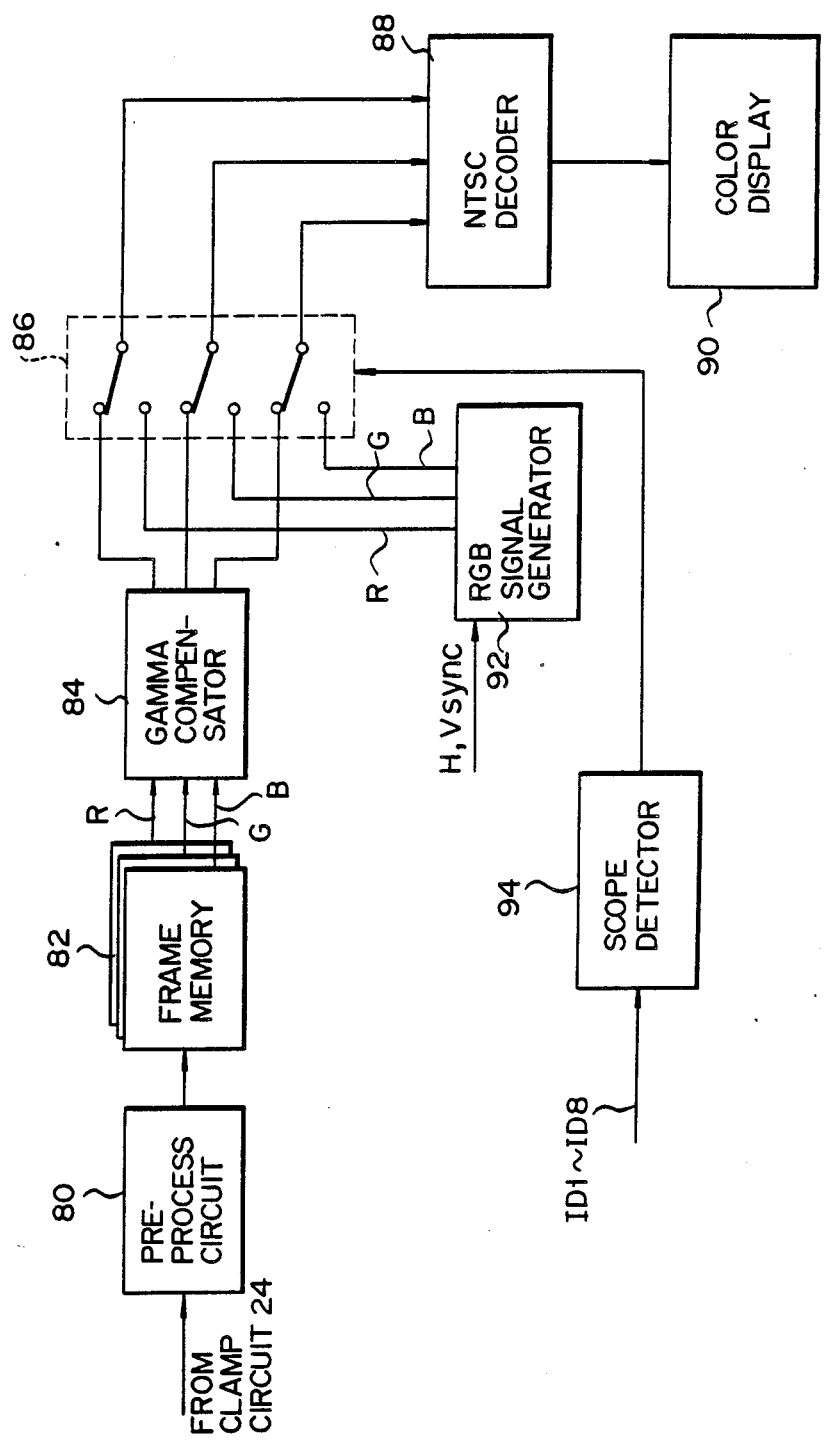
FIG. 5 is a block diagram of a video process circuit according to an embodiment of the invention.

FIG. 5 is a block diagram of a video process circuit connected to the output of clamp circuit 24, shown in FIG. 1. The output of circuit 24 is applied to frame memories 82 through pre-process circuit 80. Memories 82 are provided individually for three colors; red (R), green (G), and blue (B). Image signals of these colors are stored in their corresponding memories. The R, G and B image signals, read out from memories 82, are supplied to a first input terminal of switch 86, via gamma compensator 84. RGB signal generator 92 is connected to a second input terminal of switch 86. The output of switch 86 is supplied to color display 90 via NTSC decoder 88. The switching control of switch 86 is executed by scope detector 94, which is supplied with scope identification signals ID1 to ID8.

Figure 6:
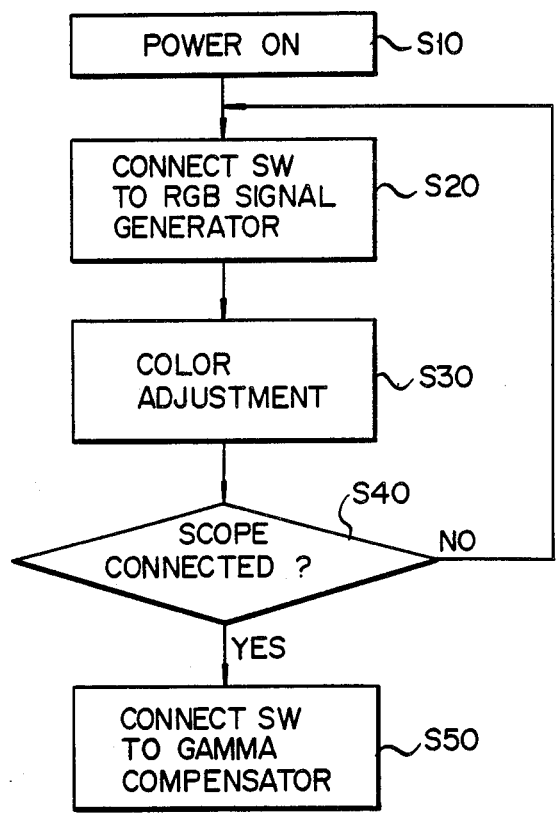
FIG. 6 is a flow chart for illustrating an operation for color adjustment of a display unit, with use of the video processing circuit shown in FIG. 5.
Figure 7A:
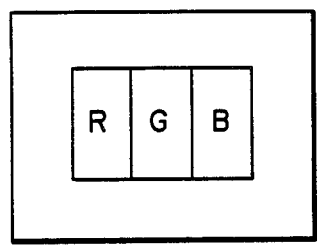
FIGS. 7A and 7B are diagrams for illustrating the display positions of color bars on a screen, at the time of color adjustment.
Figure 7B:
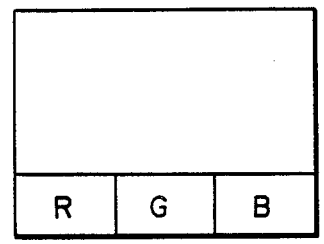

Referring now to the flow chart of FIG. 6, operation for color adjustment of the display screen will be described. When the power is turned on in step S10, switch 86 is connected to RGB signal generator 86 in step S20. Generator 92 generates R, G and B standard-color signals forming a predetermined color bars in synchronism with the V and H sync. signals. R, G and B standard-color signals are applied to the input of NTSC decoder 88, via switch 86, to be converted into NTSC signals, which are supplied to color display 90. Display 90 indicates RGB color bars, as shown in FIGS. 7A and 7B. In this case, the color bars are displayed in the central portion or at the bottom of a screen. In step S30, an operator performs color adjustment while watching the color bars. Thus, the color adjustment does not require any color chart to be picked up. After the adjustment, the operator connects the video endoscope to the control circuit. It is assumed that the video endoscope is not connected to the control circuit during color adjustment.

In step S40, scope detector 94 determines whether or not the connection of the endoscope is detected. In doing this, detector 94 indicates the connection if any one of scope identification signals ID 1 to ID 8 is 1. If the connection is not detected, the processes from step S20 to S40 are repeated. If the connection is detected, switch 86 is connected to gamma compensator 84, in step S50. In this state, image signals from memories 82 are applied to the input of NTSC decoder 88, via gamma compensator 84, and switch 86. Thus, an image of the interior of the body cavity appears on color display 90.

According to the present invention, as described above, there is provided a control circuit for video endoscope, which can be connected with any types of video endoscopes, and can effect speedy color adjustment of displayed pictures.

It is to be understood that the present invention is not limited to the embodiment described above, and that various changes and modifications may be effected therein by one skilled in the art without departing from the scope or spirit of the invention.

What is claimed is:

1. A control circuit for video endoscope, comprising:
    means for detecting the type of a video endoscope connected to the control circuit;
    means for modifying the waveform of clock pulses in accordance with the result of detection by the detecting means, and supplying the modified clock pulses to a solid-state pickup element in the endoscope; and
    means for converting image signal pulses, supplied from the pickup element, into a continuous image signal, by clamping, or sampling and holding the pulses, with a timing corresponding to the detection result given by the detecting means.

2. The control circuit for video endoscope according to claim 1, in which said detecting means discriminates the length of the endoscope as the type of the endoscope.

3. The control circuit for video endoscope according to claim 1, in which said detecting means includes a constant-current source connected in series with a resistor disposed in the endoscope, having a resistance value corresponding to the length of the endoscope, and a detector circuit for detecting a voltage at the junction of the constant-current source and the resistor.

4. The control circuit for video endoscope according to claim 3, in which said detector circuit includes a plurality of comparators for comparing the voltage, at the junction of the constant-current source and the resistor, with a plurality of reference voltages, and an adder for adding one to binary signals, as outputs from the comparators, and delivering discrimination signals.

5. The control circuit for video endoscope according to claim 1, in which said waveform modifying means includes differentiation circuit means whose time constant is determined by the output of the detecting means.

6. The control circuit for video endoscope according to claim 5, in which said differentiation circuit means includes a plurality of CR differentiation circuits with different time constants, and relay switches connected individually to the differentiation circuits, and designed so that only one of the switches is closed by the output of the detecting means, thereby supplying the clock pulses to one of the differentiation circuits.

7. The control circuit for video endoscope according to claim 1, in which said converting means includes means for clamping the image signal pulses, with the timing corresponding to the detection result given by the detecting means.

8. The control circuit for video endoscope according to claim 1, in which said converting means includes means for sampling and holding the image signal pulses, with the timing corresponding to the detection result given by the detecting means.

9. The control circuit for video endoscope according to claim 1, further comprising:
    display means for displaying the output of the converting means;
    means for generating RGB standard-color signals;
    means for detecting the connection of the video endoscope to the control circuit; and
    means for supplying the display means with the RGB standard-color signals, instead of the output of the converting means, when the connection of the endoscope is not detected.

10. The control circuit for video endoscope according to claim 9, in which said standard-color signal generating means generates RGB color-bar signals.

* * * * *